350-440
3/17/81    OR    4,256,370
                              SR

United States Patent [19]
Gold

[11] 4,256,370
[45] Mar. 17, 1981

[54] CORED LENS FOR LARGE REFRACTING TELESCOPES

[76] Inventor: Louis Gold, 2725 39th St., NW., Washington, D.C. 20007

[21] Appl. No.: 902,631

[22] Filed: May 4, 1978

Related U.S. Application Data

[63] Continuation of Ser. No. 771,703, Feb. 24, 1977, abandoned, which is a continuation of Ser. No. 619,166, Oct. 3, 1975, abandoned.

[51] Int. Cl.³ .............................................. G02B 13/00
[52] U.S. Cl. ........................................ 350/440; 350/8
[58] Field of Search ...................... 350/8, 194, 197, 20

[56] References Cited

FOREIGN PATENT DOCUMENTS 1087366  8/1960  Fed. Rep. of Germany ............ 350/20

*Primary Examiner*—John K. Corbin
*Assistant Examiner*—Matthew W. Koren

[57] ABSTRACT

A refracting telescope which is comprised essentially of an objective lens and an eyepiece is provided with a cored or annular lens for the objective lens thereby increasing the resolving power of the telescope without adversely affecting the light gathering capabilities of the telescope.

1 Claim, 3 Drawing Figures

CORED LENS FOR LARGE REFRACTING TELESCOPES

This is a continuation of application Ser. No. 771,703, filed Feb. 24, 1977, now abandoned, which in turn is a continuation of Ser. No. 619,166 filed Oct. 3, 1975, now abandoned.

BACKGROUND OF THE INVENTION

1. Field of the Invention

The present invention is directed to refracting telescopes and more specifically to an annular objective lens for such telescopes.

2. Prior Art

The telescope is an optical system by means of which an enlarged image of a distant object may be viewed. An astronomical refracting telescope consists of two convergent lenses the first of which, the objective, forms a real inverted image which is examined using a second lens called the eyepiece. In the normal state of adjustment the second focal plane of the objective coincides with the first focal plane of the eyepiece so that an incident pencil of parallel rays emerges as a parallel pencil. The image may be erected by the use of an auxiliary lens.

In the astronomical reflecting telescope, the light from a celestial objective is received on a concave primary mirror. The mirror serves the same purpose as the objective in a refracting telescope, namely, to form a real image of the object in its focal plane. This image is either received directly on a photographic plate or is examined visually be an eyepiece. This type of arrangement is the most common form of astronmical telescope used today. However, reflector telescopes pose problems in construction, particularly the problem of laying down a metallic reflecting film over so large an area. Moreover, the films are subject to deterioration and must be replaced periodically.

Although a refracting telescope is much more durable and easier to manufacture the size of the objective lens has always been a drawback. At the famous Yerkes Observatory of the University of Chicago, the telescope objective has a diameter of 40 inches or approximately 100 centimeters. With this telescope, therefore, objects with an angular separation of about one eighth of a second can be resolved. The 40 inch objective has been recognized as the practical limit since beyond 40 inches the objective lens will begin to deform under its own weight and it is very difficult to keep the lens stress free. In conjunction with this circumstance, the effect of inhomogeneities in the glass become increasingly intolerable.

Another drawback in the use of refracting telescopes for deep space observations has been the resolving power. The ability of a telescope to separate two distant objects close together, that is, the resolving power of the telescope, depends on the aperture of the objective. It has been proven that by blocking out the center of an objective lens that the resolving power of the lens will be increased. However, the light gathering capabilities of such a lens are considerably reduced making such a system completely unsuitable for deep space astronomical telescopes.

SUMMARY OF THE INVENTION

The telescope according to the present invention is provided with an annular objective lens with the central portion completely removed so as to provide a substantial reduction in weight, an increase in resolving power and no loss in light gathering capabilites due to a substantial increase in the diameter of the lens beyond the previously accepted limit for such objective lenses.

The annular objective lens structure according to the present invention lends itself to different methods of manufacture since molded blanks can be more efficiently cooled and annealed with a substantial reduction in the amount of expensive optical glass necessary. Moreover, the weight reduction itself alleviates the ponderous stresses and the creep of the glass material. Smaller objective lenses may be made by cutting out the central portion as opposed to molding an annular lens and the hollow central portion permits the use of reinforcing or supporting structures which will help to stabilize the lens with an attendant reduction in weight to improve the characteristics of the lens.

The foregoing and other objects, features and advantages of the invention will be apparent from the following more particular description of the preferred embodiment of the invention as illustrated in the accompanying drawings.

DETAILED DESCRIPTION OF THE PREFERRED EMBODIMENTS

Figure 1:
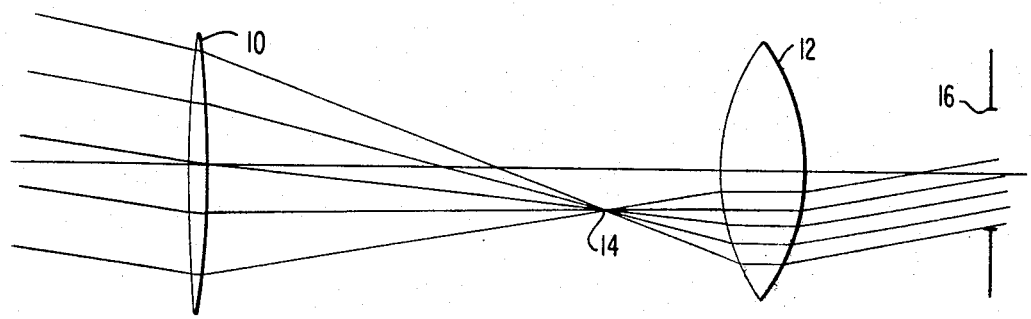
FIG. 1 is a schematic drawing showing the objective lens and eyepiece of a refracting telescope and representative light paths.

The astronomical refracting telescope shown schematically in FIG. 1 is comprised of a first convergent lens 10 called the objective and a second convergent lens 12 called the eyepiece. Rays from one point of a distant object are shown entering a long-focus objective lens 10 from the left as a parallel beam. These rays are brought to a focus and form a point image at 14. The rays then pass through the eyepiece 12 to an exit pupil 16. This point image is the real image and normally the real image is made to coincide with the focal points of both lenses with the result that the image rays leave the eyepiece as a parallel bundle and the virtual image is at infinity.

Figure 2:
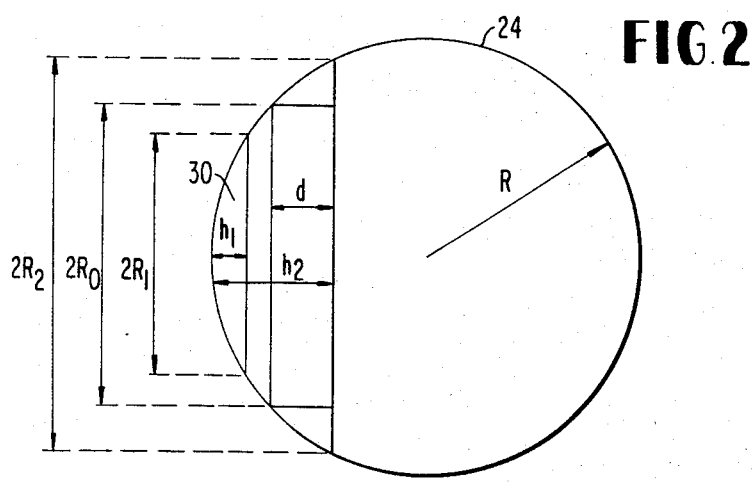
FIG. 2 is a schematic explanatory sketch comparing a conventional objective lens with the cored lens according to the present invention.
Figure 3:
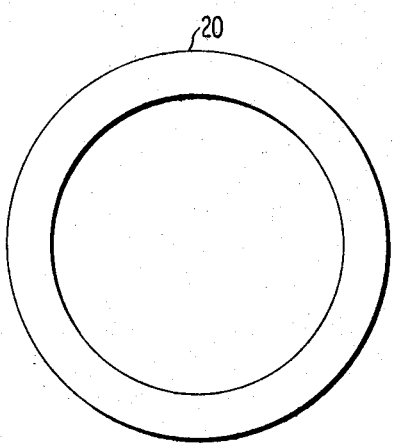
FIG. 3 is a schematic view showing an annular objective lens according to the present invention.

According to the present invention an annular lens such as the lens 20 shown in FIG. 3 would be substituted for the objective lens 10 and would have the same focal length as the objective lens. The presence of the central core will not interfere with visual observations since the objective lies outside both the focal and accommodation distances of the viewer. Therefore, the central core in the lens cannot be seen through the eyepiece. The external diameter of the annular lens which would be substituted for the objective lens 10 would be considerably larger than the previously acceptable maximum for objective lenses so that the light loss by eliminating the central material will be compensated while still obtaining a net weight reduction. An explanation of this phenomenon can best be explained by referring to the schematic arrangement shown in FIG. 2.

Considering the circle 24 in FIG. 2 to be a sphere, the segment 30 would be a spherical lens with a diameter $2R_1$ and a maximum thickness $h_1$. The plano-convex area $A_1$ is given by $$A_1 = 2\pi R h_1 \qquad (1)$$

where R is the radius of curvature associated with a prescribed focal length. The volume of the lens is that of the segment and follows from simple solid geometry:

$$V_1 = \tfrac{1}{3}\pi h_1^2 (3R - h_1) \qquad (2)$$

Suppose then that an effective larger segment plano-convex lens also having a radius of curvature R has a diameter $2R_2 > 2R_1$. Removal of a central channel comprised of a segment having $2R_0 < 2R_2$ yields a resultant curved surface the area of which is given as follows:

$$A_2 = 2\pi R h_2 - 2 R h_0 \qquad (3)$$

The net volume of refracting material becomes then $$V_2 = \tfrac{1}{3}\pi h_2^2 (3R - h_2) - \tfrac{1}{3}\pi h_{02} (3R - h_0) - \pi R_0^2 d \qquad (4)$$

where d is the depth of the cylindrical section removed together with the segment. Elementary geometry requires $$R_0^2 = h_0 (2R - h_0) \qquad (5)$$

$$d = h_2 - h_0 \qquad (6)$$

These underlying relations permit identification of the volume reduction for prescribed light gathering levels. The complete analysis becomes rather involved algebraically and it is sufficiently revealing to examine the limit where $h_2 = R$ which yields quite readily:

$$V_1/V_2 = 2R + h_0/2(R - h_0) \qquad (7)$$

Clearly, the ratio cannot be less than unity and, in fact, as $h_0/R \to 1$, it approaches infinity.

It can be shown that for $h_2 \neq R$, that as $h_0/R \to 1$, the ratio approaches a finite value that grows as $h_2/R \to 1$.

Hence, mathematical analysis of the proposed lens structure does indeed admit the prospect of conserving weight and volume of a refracting lens while optimizing its light gathering quality. Moreover, it is precisely in the realm of very large objective lens diameters such as used in astronomical refracting telescopes that the gain becomes significant.

While the above formulas have been computed with respect to a plano-convex annular lens similar calculations could be made with respect to a double convex annular lens which would be substituted directly in the schematic telescope arrangement of FIG. 1 for the objective lens 10.

The feasibility of molding an objective lens having a diameter far in excess of the previously recognized limit of 40 inches is greatly facilitated by providing a hollow central core. The stresses involved in annealing and cooling an annular lens of large diameter as opposed to a disc-like lens of large diameter are minimized due to the reduction in the volume of glass necessary to treat. Furthermore, additional heat sinks can be applied in the annular hollow portion to aid in the cooling of the molded annular lens structure. It is obvious that the amount of expensive optical glass necessary to provide the necessary objective lens is substantially reduced by eliminating the central portion of the lens.

As previously pointed out, in addition to the weight problem, the stability of the large objective lens over 40 inches in diameter is eliminated by the annular lens according to the present invention. In addition to external supporting structure for the annular lens internal supporting structure can also be provided to increase the stability of the lens without negating the weight reduction achieved by eliminating the central portion of the lens. The greater rigidity of the lens structure will also tend to diminish light losses from inhomogeneities ascribable to excessive mass.

In summary, the present invention provides a new and improved astronomical refracting telescope by utilizing an annular objective lens which will substantially increase the resolving power of the telescope without any loss of light gathering capability. In fact, under certain circumstances the light gathering capabilities of the annular lens can be substantially greater than those previously obtainable with a double convex disc-like lens having a solid center.

While the invention has been particularly shown and described with reference to a preferred embodiment thereof it will be understood by those in the art that various changes in form and details may be made therein without departing from the spirit and scope of the invention.

What is claimed is:

1. An annular cored lens having an outer diameter substantially greater than 40" (fourty inches) with an inner diameter allowing a light-gathering ability substantially larger than the fourty inch solid disc lens.

* * * * *